United States Patent [19]
Okamoto

[11] Patent Number: 5,174,015
[45] Date of Patent: Dec. 29, 1992

[54] APPARATUS FOR MANUFACTURING CYLINDRICAL SLIDE BEARING

[75] Inventor: Shin Okamoto, Narashino, Japan

[73] Assignee: NDC Co., Ltd., Narashino, Japan

[21] Appl. No.: 721,309

[22] Filed: Jun. 26, 1991

[30] Foreign Application Priority Data

Aug. 6, 1990 [JP] Japan .................. 2-208920

[51] Int. Cl.⁵ .................. B23P 23/00; F16C 33/00
[52] U.S. Cl. .................. 29/713; 29/821; 29/822; 29/898.054; 29/898.057; 29/898.058
[58] Field of Search ............ 29/898.054, 898.056, 29/898.057, 898.058, 898.059, 711, 791, 821, 822, 713; 72/357, 361, 368, 370, 399, 402, 403, 405

[56] References Cited

U.S. PATENT DOCUMENTS

| | | | |
|---|---|---|---|
| 4,309,890 | 1/1982 | Ichikawa et al. | 29/898.057 X |
| 4,466,267 | 8/1984 | Casler et al. | 72/368 |
| 4,638,538 | 1/1987 | Kohama et al. | 29/898.054 |
| 4,660,401 | 4/1987 | Kohama et al. | 29/898.057 X |
| 4,934,035 | 6/1990 | Aubele et al. | 29/898.057 X |

*Primary Examiner*—Joseph M. Gorski
*Assistant Examiner*—S. Thomas Hughes
*Attorney, Agent, or Firm*—Rothwell, Figg, Ernst & Kurz

[57] ABSTRACT

There is disclosed an apparatus for manufacturing a cylindrical slide bearing. The apparatus comprises a belt conveyer for conveying a U-shaped semiprocessed product, a press unit composed of a punch and a die confronting each other and respectively having semi-cylindrical recessed portions, a core holder inserted into the U-shaped semiprocessed product and holding the U-shaped semiprocessed product, the core and the holder having a circular shape in cross section, and a stepper motor connected to the core and holder for rotating the core and holder radially around the axis of the core and holder. There is also disclosed a method for manufacturing a cylindrical slide bearing with use of the apparatus set forth above.

7 Claims, 4 Drawing Sheets

APPARATUS FOR MANUFACTURING CYLINDRICAL SLIDE BEARING

BACKGROUND OF THE INVENTION

1. Field of the Invention

The present invention relates to a method of and an apparatus for manufacturing a cylindrical slide bearing.

2. Prior Art

There have been employed various methods of manufacturing a cylindrical slide bearing such as those comprising the steps of employing a bearing material formed by layering a bearing metal alloy on a steel plate forming an inner peripheral surface of the bearing and then subjecting the bearing material to a bending processor, thereby forming a cylindrical shape. As the bearing material, there has been employed a semiprocessed product having a U-shape as a primary round product, and the method comprises the steps of inserting a core into the semiprocessed product, subjecting the semiprocessed product to a one time pressing process, i.e. giving the semiprocessed product one pressing by a press unit which is provided with a die and a punch having respectively recessed portions of semi-cylindrical shapes.

However, the bearing made by the above methods is inferior in the round accuracy thereof when subjected to one pressing and is liable to have a heptagonal shape at worst. Hence, the core and the semiprocessed product are respectively manually rotated for subjecting the semiprocessed product to a plurality of pressings, which involves unstable productivity with low accuracy. It is desirable that the cylindrical slide bearing is in general pressed into and securely fixed to a housing and brought into contact with the housing having superior heat radiation property. Therefore, it is desirable that the cylindrical slide bearing be formed in a complete circular shape.

SUMMARY OF THE INVENTION

It is therefore an object of the first aspect of the present invention to provide a method of manufacturing a cylindrical slide bearing composed of the steps of inserting a core having a function of a holder for a U-shaped semiprocessed product (hereinafter referred to as a core and holder) into the U-shaped semiprocessed product, the core and holder having a circular shape in cross section, rotating radially the semiprocessed product together with the core and holder at a predetermined value, subjecting the semiprocessed product to a pressing process on a press unit composed of a punch and a die confronting each other and respectively having recessed portions to form a cylindrical shape, connecting the core and holder to a stepper motor, operating the press unit every time the core and holder is rotated in the predetermined angular interval upon reception of a signal which is previously programmed and issued by a sequencer, and subjecting the semiprocessed product to a plurality of pressings to form the cylindrical shape.

It is a second aspect of the present invention to provide an apparatus for manufacturing a cylindrical slide bearing comprising a belt conveyer for conveying a U-shaped semiprocessed product, a press unit composed of a punch and a die confronting each other respectively having semiprocessed cylindrical recessed portions, and a supply unit disposed at an end of the belt conveyer for clamping the semiprocessed product and supplying the semiprocessed product to the press unit.

The apparatus also includes a core having a function of a holder for a U-shaped semiprocessed product, the core holder having a circular shape in cross section, and a stepper motor for rotating the semiprocessed product together with the core and holder radially around the axis of the core and holder.

The method of manufacturing the slide bearing according to the first aspect of the present invention comprises the steps of inserting a core and holder into a U-shaped semiprocessed product having a circular shape in cross section, rotating radially the semiprocessed product together with the core and holder around the axis of the core and holder at predetermined angular intervals, subjecting the semiprocessed product to a pressing process on a press unit composed of a punch and a die confronting each other and respectively having semicylindrical recessed portions to form a cylindrical shape, connecting the core and holder to a stepper motor, operating the press unit every time the core and holder is rotated by the stepper motor at the predetermined angular intervals upon reception of signals which are previously programmed by a sequencer, and subjecting the semiprocessed product to a plurality of pressings to form the cylindrical shape.

The apparatus for manufacturing a cylindrical slide bearing according to the second aspect of the present invention comprises a belt conveyer for conveying a U-shaped semiprocessed product, a press unit composed of a punch and a die confronting each other and respectively having semi-cylindrical recessed portions, a supply unit for clamping the semiprocessed product conveyed at an end of the belt conveyer and supplying the thus clamped semiprocessed product to the press unit, a core and holder inserted into the U-shaped semiprocessed product and holding the U-shaped semiprocessed product, the core and the holder having a circular shape in cross section, and a stepper motor connected to the core and holder for rotating the semiprocessed product together with the core and holder radially around the axis of the core and holder.

The apparatus for manufacturing the slide bearing can be provided with the following elements.

1. A sequencer connected to the stepper motor for driving the stepper motor. 2. A guide attached to the belt conveyer for supporting an open end of the semiprocessed product. 3. A vibration feeder interposed between the belt conveyer and the supply unit for delivering linearly the semiprocessed product. 4. A vertical drive unit for driving vertically both the core and holder and the stepper motor. 5. Both the core and holder and the stepper motor are elastically supported on a base via springs. 6. An extraction device attached to the core and holder movable in the axial direction thereof for extracting the processed cylindrical slide bearing from the core and holder.

The above and other objects, features and advantages of the present invention will become more apparent from the following description taken in conjunction with the accompanying drawings.

PREFERRED EMBODIMENT OF THE INVENTION

A method of and apparatus for manufacturing a cylindrical slide bearing according to first and second embodiments of the present invention will be described with reference to FIGS. 1 to 9.

A semiprocessed product of a slide bearing comprises the bearing material 1a and joint portions 1b composed of convex and concave portions respectively defined at both ends of the bearing material 1a which is subjected to a bending process to form a U-shape in which the bearing metal alloy is disposed on the inner side.

Figure 6A:
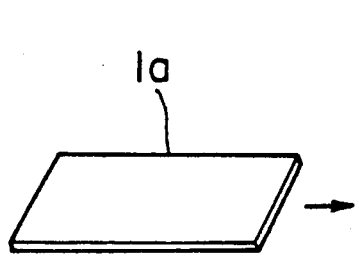
FIG. 6(a) is a perspective view of a bearing material.
Figure 6B:
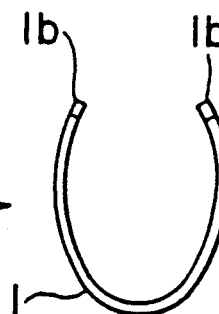
FIG. 6(b) is a side view showing a semiprocessed cylindrical slide bearing.

A bearing material comprises a rectangular steel plate and a bearing alloy metal layered on the steel plate for forming a bearing surface, as illustrated in FIG. 6(a).

To form the bearing material 1a into the semiprocessed product, there has been employed a U-shaped or elliptical core, fundamentally disclosed in U.S. Pat. No. 1,892,555 issued in the year of 1932.

Figure 7:
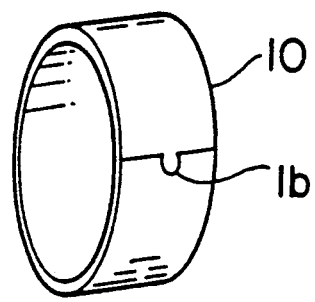
FIG. 7 is a perspective view showing the processed cylindrical slide bearing.
Figure 6C:
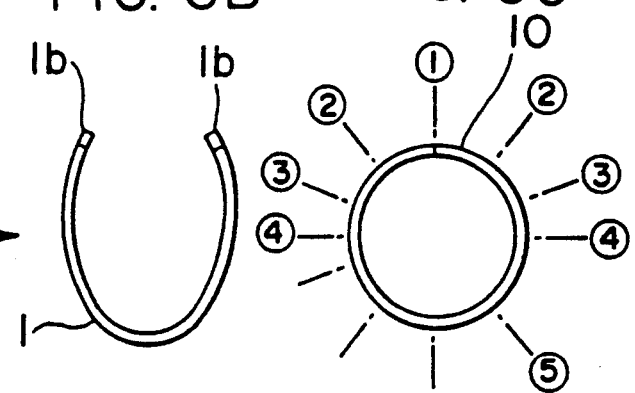
FIG. 6(c) is a side view showing a processed cylindrical slide bearing.

A core holder 4 positioned on a press unit 7 by way of a feeder unit 2 and a supply unit 3 is inserted into the semiprocessed product 1. The semiprocessed product 1 is rotated together with the core holder 4 by a loader unit 6 provided with a stepper motor 5 operative upon reception of a pulse signal issued by a sequencer. The semiprocessed product 1 is subjected to a round processing through engagement of the joint portions 1b by the press unit 7 for forming a predetermined cylindrical shape whereby the semiprocessed product 1 is formed as a cylindrical slide bearing 10 as shown in FIG. 6(c) and FIG. 7. The cylindrical slide bearing 10 is in general pressed into a housing for rotatably supporting a rotary shaft and has an inner peripheral surface provided with an oil groove, not shown.

Figure 1:
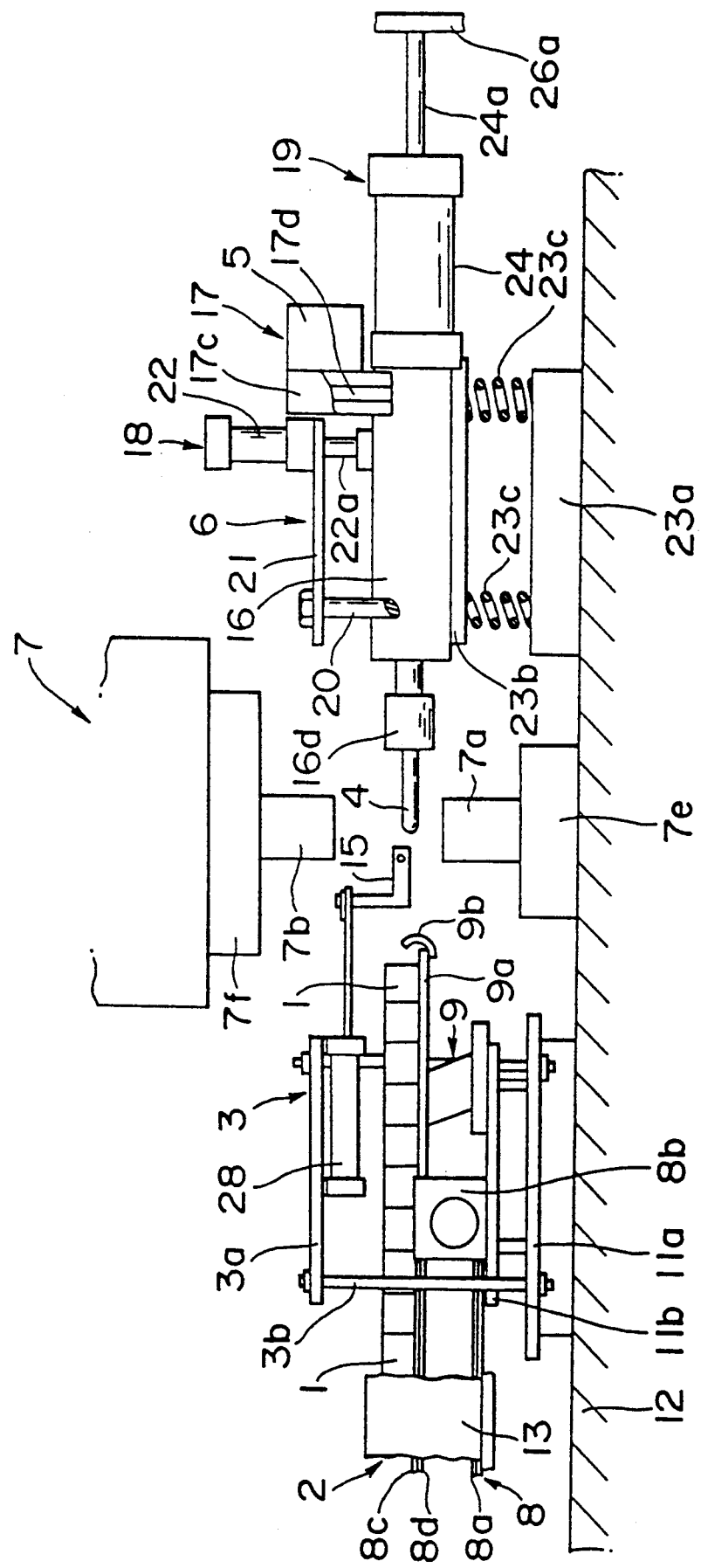
FIG. 1 is a front view showing an apparatus for manufacturing a slide bearing, partly eliminating constituents thereof.
Figure 2:
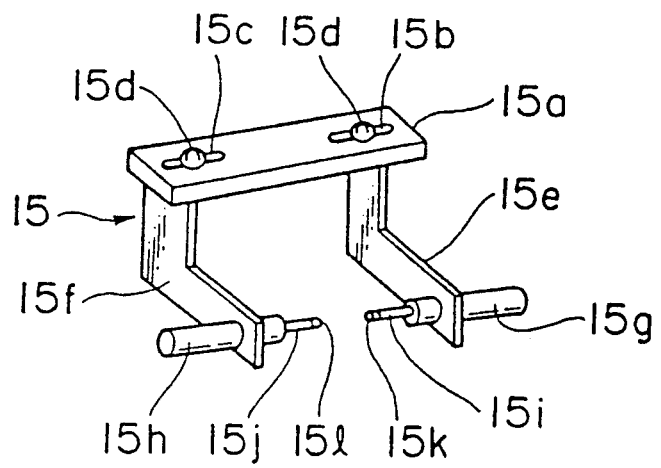
FIG. 2 is a perspective view of a clamping unit, a constituent of the apparatus of FIG. 1.
Figure 4:
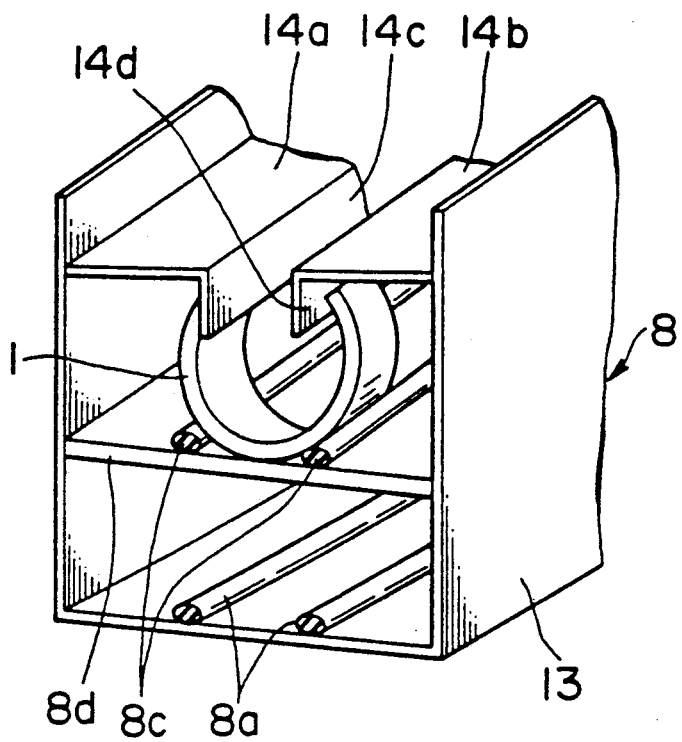
FIG. 4 is a perspective view of a belt conveyer, a constituent of the apparatus of FIG. 1.
Figure 5:
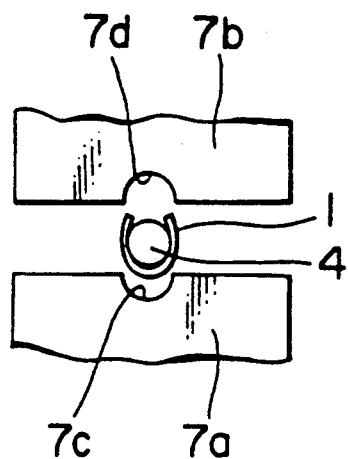
FIG. 5 is a side view showing a die and a punch, constituents of a press unit of FIG. 1.

The feeder unit 2 comprises a belt conveyer 8 and a vibration feeder 9 connected to the other end of the belt conveyer 8. The belt conveyer 8 comprises a pair of endless annular belts 8a, a motor 8b for driving the belts 8a in a predetermined direction, and a supporter 8d for supporting flatly the conveying surfaces 8c of the belts 8a, as illustrated in FIGS. 1 and 4. The motor 8b and the supporter 8d are fixed to a base 12 by way of a supporting frame 13 for covering right and left portions, and lower portions of the pair of belts 8a as illustrated in FIG. 4 and by supporting stands 11b and 11a as illustrated in FIG. 1. The supporting frame 13 has guides 14a and 14b respectively bent in an L-shape and opposed with each other at the upper inner surface thereof. The guides 14a and 14b have bent portions 14c and 14d for slidably supporting the open end of the semiprocessed product 1, as illustrated in FIG. 4, in order to convey the semiprocessed product at a fixed posture or position. Although the bent portions 14c and 14d support inner sides of the open end of the semiprocessed product 1, they can support outer sides thereof.

The vibration feeder 9 has a known structure and gives repeatedly reciprocal vibration to a table 9a on which the semiprocessed product 1 is placed for linearly conveying the semiprocessed product 1. The table 9a has the other end provided with a stopper 9b made of a rubber.

The vibration feeder unit 9 may be provided with a guide such as the guides 14a and 14b provided at the belt conveyer unit 8.

The supply unit 3 comprises a clamping unit 15 and a linear motion unit 28 composed of a double action type cylinder unit for giving reciprocal lateral (right and left motions in FIG. 1) linear motions to the clamping unit 15 or of a rack and pinion, or the like. The linear motion unit 28 is fixed to the base 12 by way of a fixing table 3a, a supporter 3b and the supporting stand 11a. The clamping unit 15 comprises, as illustrated in detail in FIG. 2, a base plate 15a having slits 15b and 15c defined longitudinally in the base plate 15a, L-shaped supporting members 15e and 15f respectively having base ends fixed to the slits 15b and 15c by screws 15d, and air cylinders 15g and 15h respectively fixed to arms of the supporting members 15e and 15f. The air cylinders 15g and 15h respectively have cylinder rods 15i and 15j and springs housed therein, the cylinder rods 15i and 15j being provided with clamping nails 15k and 15l having a high frictional coefficient at the tip ends thereof. The interval between the clamping nails 15k and 15l, at the state where they are returned to their original positions by the resilient force of the springs incorporated in the air cylinders 15g and 15h, can be adjusted by releasing the screws 15d and increasing and decreasing the interval between the supporting members 15e and 15f, thereby gripping the semiprocessed product 1 having the predetermined size at the middle portion thereof.

The press unit 7 comprises a die 7a placed on a bed 7e on the base 12 and a punch 7b fixed on a slider 7f. The die 7a and the punch 7b respectively have semicylindrical recessed portions 7c and 7d which confront each other. The recessed portions 7c and 7d have central axial lines extending forward and backward in FIG. 5 and shapes conforming to half of the circumference of the cylindrical slide bearing 10.

The core and holder 4 has a circular shape in cross section which accords with an inner circumferential surface of the cylindrical slide bearing 10 and is removably attached to an attachment 16d protruding from one end of the loader unit 6.

The loader unit 6 comprises a rotary motion unit 17 for giving a rotary motion to the core and holder 4 around its axis, a vertical drive unit 18 for vertically moving the core and holder 4 and an extraction unit 19 attached to a frame member 16 for extracting the processed cylindrical slide bearing 10 from the core and holder 4. The frame member 16 is cylindrical and is fixed to an upper table 23b which is elastically supported by springs 23c interposed between the upper table 23b and a lower table 23a mounted on the base 12. A rotary shaft 16b is rotatably supported in the frame member 16 by a pair of rolling bearings 16a as shown in FIG. 8 and the core and holder 4 is removably attached to the attachment 16d mounted on the tip of the rotary shaft 16b.

Figure 8:
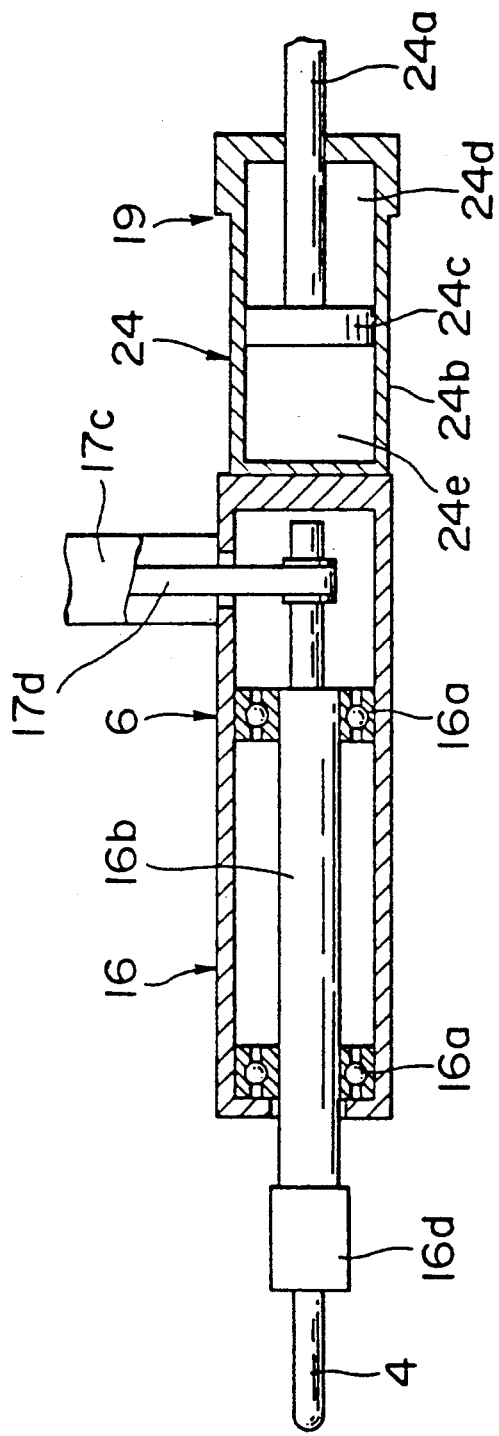
FIG. 8 is a cross sectional view showing a main portion of a loader unit, a constituent of the apparatus of FIG. 1.
Figure 9:
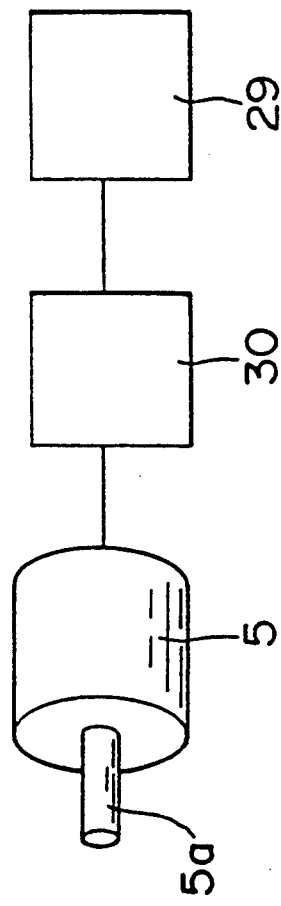
FIG. 9 is an electric circuit diagram of a stepper motor, a constituent of the apparatus of FIG. 1.

The rotary motion unit 17 is, as illustrated in FIGS. 1, 8 and 9, provided with the stepper motor 5, a belt 17d disposed between the motor shaft 5a of the stepper motor 5 and a rotary shaft 16b positioned at the other end of the frame member 16, and a belt cover 17c fixed to the frame member 16 for covering the belt 17d. The stepper motor 5 is actuated to drive the belt 17d, thereby rotating the rotary shaft 16b with accuracy so that the core and holder 4 incorporated with the rotary shaft 16b can be accurately rotated. The stepper motor 5 is, as shown is FIG. 9, connected to a pulse oscillator 30 which is connected to a sequencer 29. The stepper motor 5 is rotatably driven at given angular intervals upon reception of pulse signals issued by the pulse oscillator 30 when the pulse oscillator 30 receives previously programmed signals from the sequencer 29. The pulse signals are issued, e.g. 1000 pulses per revolution so that the stepper motor 5 can rotate 0.36° per one step.

The vertical drive unit 18 comprises an air cylinder 22 mounted on a supporter 21 fixed to the base 12 by way of a supporting rod 20 is provided with springs 23c. The air cylinder 22 has a cylinder rod 22a which is fixed to an outer circumferential surface of the frame member 16 at the tip end thereof. When the air cylinder 22 receives air under pressure, the frame member 16 incorporating the core combined with holder 4, the rotary motion unit 17 and the extraction unit 19 are respectively driven in the upward direction. If the air under pressure is drained from the air cylinder 22, the frame member 16 can be returned to the state where the frame member 16 is resiliently supported by the springs 23c on the base 12.

Figure 3:
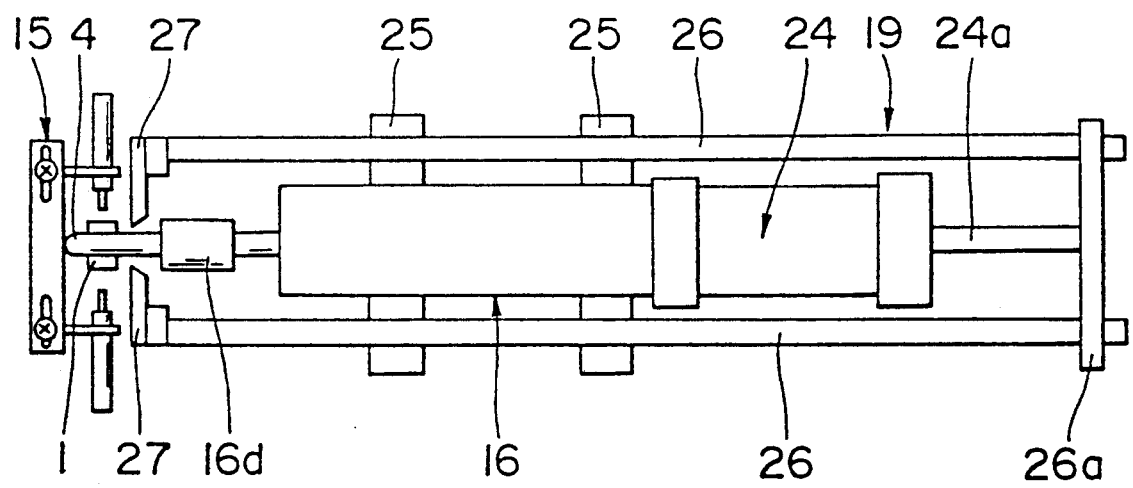
FIG. 3 is a plan view showing the clamping unit and an extraction unit, constituents of the apparatus of FIG. 1.

The extraction unit 19 comprises, as illustrated in FIGS. 3 and 8, a double action type extraction cylinder 24, a connecting member 26a to which a piston rod 24a of the extraction cylinder 24 is connected, a pair of frame bodies 26 connected to the connecting member 26a. The frame bodies 26 are supported and guided slidably in the direction of the central axis of the frame member 16 by a plurality of groove portions for the bearing member 25 fixed to both sides of the frame member 16. A pair of engaging nails 27, each fixed to one end of the frame bodies 26 are positioned around the circumference of the core and holder 4 at the inner end edges thereof with a given interval therebetween. The extraction cylinder 24 has a piston rod 24a movable in the central axis of the frame member 16. The extraction cylinder 24 comprises a cylinder body 24b, a piston 24c for slidably engaging interior of the cylinder body 24b and for partitioning a chamber into a pair of pneumatic chambers 24d and 24e, and the piston rod 24a. The piston rod 24a has a projecting end portion connected to the frame bodies 26 by way of the connecting member 26a. When the air under pressure is supplied to the one of the pneumatic chamber 24d to thereby move the frame bodies 26 leftward in FIG. 1, the processed cylindrical slide bearing 10 wound around the core and holder 4 can be extracted by the pair of engaging nails 27. When the air under pressure is supplied to the other pneumatic chamber 24e, the frame bodies 26 and the pair of engaging nails 27 can be returned to their original positions.

An operation of the apparatus for manufacturing the cylindrical slide bearing will be described hereinafter.

The semiprocessed product 1 is placed on the belt 8a of the belt conveyer 8, which is driven by the motor 8b, whereby the semiprocessed product 1 will be conveyed rightward in FIG. 1 along the conveying surface 8c of the belt 8a which is supported flat by the supporter 8d. At that time, the U-shaped semiprocessed product 1 is stably delivered by the belt 8a which is supported flat by the supporter 8d, and is kept constant in the posture thereof by the bent portions 14c and 14d of the guides 14a and 14b. Thereafter, the semiprocessed product 1 is transferred to one end of the table 9a by the vibration feeder 9 and is more stably conveyed thereby compared with the belt conveyer 8, and is then stopped by the stopper 9b made of rubber and aligned thereon.

The semiprocessed product 1 reaches the other end of the table 9a and is clamped by the clamping unit 15. That is, air under pressure is supplied to pneumatic chambers of air cylinders 15g and 15h so that the cylinder rods 15i and 15j are protruded from the air cylinders 15g and 15h whereby one piece of semiprocessed product 1 which has reached the other end of the table 9a is clamped by the clamping nails 15k and 15l. The clamping unit 15 starts operation upon reception of signals which are issued when a sensor, not shown, detects that the semiprocessed product 1 has reached the other end of the table 9a, that the operation press unit 7 of the completed has been and is ready to subject another semiprocessed product 1 to the round processing, and that the cylindrical slide bearing 10 is not present on the die 7a. Successively, the semiprocessed product 1 thus clamped by both the clamping nails 15k and 15l is transferred onto the die 7a of the press unit 7 by actuating the linear motion unit 28. At this time, the semiprocessed product 1 is transferred by deforming elastically the stopper 9b made of rubber.

Thereafter, the core and holder 4 inserts into and holds the semiprocessed product 1. At this time, the vertical cylinder 22 is actuated in necessity to allow the height of the core and holder 4 to conform to the semiprocessed product 1 thus clamped by clamping unit 15. At this state, the semiprocessed product 1 is held by the core and holder 4 due to the friction force caused between the semiprocessed product 1 and the core and holder 4. Thereafter, the linear motion unit 28 is actuated for returning the clamping unit 15 to its original position so that the clamping unit 15 is ready for clamping the next semiprocessed product 1.

Then, the press unit 7 is driven to lower the punch 7b for subjecting the semiprocessed product 1 to the round processing between the semicylindrical recessed portion 7d of the punch 7b and the recessed portion 7c of the die 7a.

Simultaneously with subjecting the semiprocessed product 1 to the round processing, the stepper motor 5 is rotatably driven in a given manner at the state where the punch 7b of the press unit 7 is raised and the air cylinder 22 of the vertical drive unit 18 is driven. As a result, the core and holder 4 is slightly raised to prevent interference between the press unit 7 and the semiprocessed product 1 so that the rotary shaft 16b is rotated with accuracy to rotate the core and holder 4 at the predetermined angular interval. This is done by way of the belt 17d entrained between a motor shaft 5a of the stepper motor 5 and the rotary shaft 16b. Inasmuch as the frame member 16 is supported on the base 12 by way of the springs 23c, it is possible to subject the U-shaped semiprocessed product 1 to pressings at the state where the frame member 16 is elastically supported on the base 12 by way of the springs 23c when the air under pressure is drained from the pneumatic chamber of the air cylinder 22 and the press unit 7 is driven. In this manner, the U-shaped semiprocessed product 1 is subjected to a plurality of pressings between the semicylindrical recessed portions 7c and 7d around the core combined with holder 4 having the circular shape in cross section, thereby completing the round processing to form the cylindrical slide bearing 10.

The stepper motor 5 is, as illustrated in FIG. 9, rotatably driven at predetermined angular intervals every time the pulse oscillator 30 issues pulse signals upon reception of previously programmed signals from the sequencer 29. The position of the cylindrical slide bearing 10 to be subjected to pressings by the punch 7b is varied from the joint denoted at ① of both ends of the bearing material 1a to the side portions denoted at ④, i.e. extending 180° as illustrated in FIG. 6(c). The positions and the numbers to be subjected to the pressings by the punch 7b are determined by consideration of the size of the cylindrical slide bearing 10 and the shape of an oil groove defined at the inner surface thereof. Thus, the cylindrical slide bearing 10 close to the complete circular shape can be manufactured.

After completion of the given pressing operation, the press unit 7 is stopped while the punch 7b is positioned at its top dead center and thereafter the extraction unit 19 is driven. The extraction unit 19 is driven at the state where the interference between the manufactured cylindrical slide bearing 10 held by the core and holder 4 and the recessed portion 7c of the die 7a is prevented by driving of the air cylinder 22. That is, the air under pressure is introduced into the pneumatic chamber 24d of the double action type air cylinder 24, thereby moving the piston rod 24a leftward in FIG. 8 so that the pair of engaging nails 27 are pushed out by way of the connection member 26a and the pair of frame bodies 26. As a result the cylindrical slide bearing 10 wound around the core and holder 4 is extracted from the die 7a to the vibration feeder unit 9.

The cylindrical slide bearing 10 thus manufactured by the present apparatus and the cylindrical slide bearing prepared in accordance with the prior art method are respectively measured at their outer diameter dimensions by a micrometer. Assume the difference between the measured maximum value and minimum value is a maximum dispersion value. Assuming that the stepper motor 5 is rotatably driven on the basis of the pulse signals issued by the oscillator 30 upon reception of the previously programmed data provided by the sequencer 29, thereby subjecting the cylindrical slide bearing 10 of the present invention to two pressings at the two sides denoted at ② (positioned at 40° about the joint portion denoted at ①) and one pressing at the joint portion denoted at ①, i.e., three pressings in total. On the other hand, the bearing manufactured by the prior art method is subjected to one pressing at the joint portion denoted at ① alone. Both the cylindrical slide bearings of the prior art and of the present invention are composed of a back plate made of steel having a thickness of 1.6 mm. Metal alloys of Cu-Pb are layered on each of the back plates with each layer having a thickness of 0.2 mm and being subjected to sintering. As a result, the average value of the maximum dispersion value is 0.25 mm at the measured points denoted at ① to ⑤ in FIG. 6(c) according to the bearing manufactured by the prior art method, while the average value is 0.09 mm according to the cylindrical slide bearing 10 of the present invention. The average value of the maximum dispersion value is the average value represented by n=180 pieces. The average value of the maximum dispersion value is less according to the present invention than that of the conventional one, hence the cylindrical slide bearing 10 and the housing are brought into contact with each other at the entire surfaces thereof, whereby the cylindrical slide bearing can be fixed to the housing with assurance and an excellent radiating property can be obtained.

There can be obtained the following effects according to the present invention.

(1) The round processing accuracy of the cylindrical slide bearing can be remarkably improved since the U-shaped semiprocessed product is subjected to the round processing by the press unit while the same semiprocessed product is rotated at the predetermined angular interval around the axis of the core and holder by the stepper motor, this rotation at the state occuring in which the product is held by the core and holder according to the present method of and apparatus for manufacturing the cylindrical slide bearing. Accordingly, the cylindrical slide bearing can be fixed to the housing with assurance and the excellent radiating property can be obtained.

(2) The present method of and apparatus for manufacturing the cylindrical slide bearing are conspicuously superior both in safety and productivity compared with the method for subjecting the bearing material to a plurality of pressings by rotating the core and holder manually.

(3) Inasmuch as the core and holder can be rotated by the stepper motor, the semiprocessed product can be precisely rotated so that the quality of the product can be satisfactorily assured according to both the method of and apparatus for manufacturing the cylindrical slide bearing. Furthermore, the productivity can be improved since the semiprocessed product can be formed into the cylindrical slide bearing by the continuous process according to the present apparatus for manufacturing the cylindrical slide bearing.

Although the invention has been described in its preferred form with a certain degree of particularity, it is to be understood that many variations and changes are possible in the invention without departing from the scope thereof.

What is claimed is:

1. An apparatus for manufacturing a cylindrical slide bearing comprising;
    a belt conveyor for conveying a U-shaped semiprocessed product;
    a press unit composed of a punch and a die confronting each other and respectively having semicylindrical recessed portions; cylindrical recessed portions;
    a supply unit for clamping the semiprocessed product conveyed at an end of the belt conveyor and supplying the thus clamped semiprocessed product to the press unit;
    a core and holder for insertion into the U-shaped semiprocessed product and for holding the U-shaped semiprocessed product, the core and holder having a circular shape in cross section; and
    a stepper motor connected to the core and holder for rotating the core and holder radially around an axis of the core and holder.

2. An apparatus for manufacturing a cylindrical slide bearing according to claim 1, wherein the stepper motor is connected to a sequencer for driving the stepper motor.

3. An apparatus for manufacturing a cylindrical slide bearing according to claim 1, wherein the belt conveyer has guides attached thereto for supporting an open end of the semiprocessed product.

4. An apparatus for manufacturing a cylindrical slide bearing according to claim 1 further comprising a vibration feeder interposed between the belt conveyer and the supply unit for delivering linearly the semiprocessed product.

5. An apparatus for manufacturing a cylindrical slide bearing according to claim 2 further comprising a vertical drive unit for driving vertically both the core and holder and the stepper motor.

6. An apparatus for manufacturing a cylindrical slide bearing according to claim 1, wherein both the core and holder and the stepper motor are elastically supported on a base via springs.

7. An apparatus for manufacturing a cylindrical slide bearing according to claim 1 further comprising an extraction device movable in the axial direction of the core and holder for extracting the processed cylindrical slide bearing from the core and holder.

* * * * *

UNITED STATES PATENT AND TRADEMARK OFFICE
CERTIFICATE OF CORRECTION

PATENT NO. : 5,174,015

DATED : December 29, 1992

INVENTOR(S) : Shin OKAMOTO

It is certified that error appears in the above-identified patent and that said Letters Patent is hereby corrected as shown below:

Title Page:
　　Item [57], in the abstract, line 6, after "core" insert --and--.

Col. 3, line 40, after "core" insert --and--.

Col. 3, line 43, after "core" insert --and--.

Col. 3, line 65, "Fig. 4" should be --Fig. 4,--.

Col. 4, line 13, delete "a".

Col. 5, line 28, "combined with" should be --and--.

Col. 5, line 38, after "connected," insert --and--.

Col. 5, line 45, "26" should be --26,--.

Col. 5, line 57, delete "of the".

UNITED STATES PATENT AND TRADEMARK OFFICE
CERTIFICATE OF CORRECTION

PATENT NO. : 5,174,015

DATED : December 29, 1992

INVENTOR(S) : Shin OKAMOTO

It is certified that error appears in the above-identified patent and that said Letters Patent is hereby corrected as shown below:

Col. 6, line 5, "8a" should be --8a,--.

Col. 6, line 16, after "chambers of" insert --both the--.

Col. 6, line 18, "15h" should be --15h,--.

Col. 6, line 25, after "completed" delete --has been--.

Col. 7, line 52, before "and" insert --)--.

Col. 8, line 16, "at the state occurring" should be --occuring at the state--.

Col. 9, line 12, (Claim 5), "2" should be --1--.

Signed and Sealed this

Twenty-sixth Day of April, 1994

*Attest:*

BRUCE LEHMAN

*Attesting Officer*  *Commissioner of Patents and Trademarks*